(12) United States Patent
Lintz et al.

(10) Patent No.: US 11,283,985 B2
(45) Date of Patent: Mar. 22, 2022

(54) IMAGING SYSTEM FOR IRIS AUTHENTICATION AND DRIVER MONITORING

(71) Applicant: Gentex Corporation, Zeeland, MI (US)

(72) Inventors: Joshua D. Lintz, Allendale, MI (US); Kurtis L. Geerlings, Holland, MI (US); Adam R. Heintzelman, Grand Rapids, MI (US); Xiaoxu Niu, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 20 days.

(21) Appl. No.: 16/702,974

(22) Filed: Dec. 4, 2019

(65) Prior Publication Data
US 2020/0186701 A1 Jun. 11, 2020

Related U.S. Application Data

(60) Provisional application No. 62/775,574, filed on Dec. 5, 2018.

(51) Int. Cl.
*H04N 5/232* (2006.01)
*H04N 5/225* (2006.01)
(Continued)

(52) U.S. Cl.
CPC .......... *H04N 5/23209* (2013.01); *B60Q 3/70* (2017.02); *B60R 1/1207* (2013.01); *B60R 11/04* (2013.01);
(Continued)

(58) Field of Classification Search
CPC ............ H04N 5/23209; H04N 5/2256; H04N 5/2351; H04N 5/2354; H04N 5/332;
(Continued)

(56) References Cited

U.S. PATENT DOCUMENTS 5,837,994 A 11/1998 Stam et al.
5,928,572 A 7/1999 Tonar et al.
(Continued)

FOREIGN PATENT DOCUMENTS

DE 102015107406 A1 11/2016
DE 102015210870 A1 1/2017
(Continued)

*Primary Examiner* — Abdelaaziz Tissire
(74) *Attorney, Agent, or Firm* — Price Heneveld LLP; Brian James Brewer

(57) ABSTRACT

An imaging apparatus comprises a first light source configured to project a first illumination onto a vehicle occupant and a second light source configured to project a second illumination onto the vehicle occupant. The system further comprises an imager comprising a pixel array. A lens apparatus comprises a first lens comprising a first field of view and a second lens comprising a second field of view. At least one shutter is selectively controlled to transmit the first illumination from the first lens to the pixel array. The at least one shutter is further controlled to selectively transmit the second illumination from the second lens to the pixel array. The imager is configured to process the first illumination in the first field of view and the second illumination in the second field of view.

15 Claims, 4 Drawing Sheets

(51) Int. Cl.
*G06K 9/00* (2022.01)
*G02B 5/30* (2006.01)
*B60R 11/04* (2006.01)
*H04N 5/235* (2006.01)
*B60Q 3/70* (2017.01)
*B60R 1/12* (2006.01)
*B60R 11/00* (2006.01)

(52) U.S. Cl.
CPC ....... *G06K 9/00604* (2013.01); *H04N 5/2256* (2013.01); *H04N 5/2351* (2013.01); *H04N 5/2354* (2013.01); *B60R 2001/1253* (2013.01); *B60R 2011/0033* (2013.01); *G02B 5/3025* (2013.01); *G06K 9/00832* (2013.01); *G06K 9/00845* (2013.01)

(58) Field of Classification Search
CPC .. H04N 5/238; G06K 9/00604; G06K 9/2027; G06K 9/209; G06K 9/00288; G06K 9/00221; G06K 9/00832; B60Q 3/70; B60Q 3/80; B60Q 3/258; B60Q 3/68; B60R 1/1207; B60R 2011/0033; B60R 2001/1253
See application file for complete search history.

(56) References Cited

U.S. PATENT DOCUMENTS

| | | |
|---|---|---|
| 5,998,617 A | 12/1999 | Srinivasa et al. |
| 6,020,987 A | 2/2000 | Baumann et al. |
| 6,037,471 A | 3/2000 | Srinivasa et al. |
| 6,130,421 A | 10/2000 | Bechtel et al. |
| 6,137,620 A | 10/2000 | Guarr et al. |
| 6,141,137 A | 10/2000 | Byker et al. |
| 6,193,912 B1 | 2/2001 | Thieste et al. |
| 6,241,916 B1 | 6/2001 | Claussen et al. |
| 6,249,369 B1 | 6/2001 | Theiste et al. |
| 6,456,327 B1* | 9/2002 | Tsai ............... H04N 5/2259 348/344 |
| 6,519,072 B2 | 2/2003 | Nishikitani et al. |
| 6,572,233 B1 | 6/2003 | Northman et al. |
| 7,653,215 B2 | 1/2010 | Stam |
| 8,201,800 B2 | 6/2012 | Filipiak |
| 8,210,695 B2 | 7/2012 | Roth et al. |
| 8,237,909 B2 | 8/2012 | Ostreko et al. |
| 8,264,761 B2 | 9/2012 | Cammenga et al. |
| 8,339,526 B2 | 12/2012 | Minikey, Jr. et al. |
| 8,381,985 B2* | 2/2013 | Ferren ............... G06F 9/451 235/462.21 |
| 8,411,245 B2 | 4/2013 | Lee et al. |
| 8,643,931 B2 | 2/2014 | Cammenga et al. |
| 8,646,924 B2 | 2/2014 | Roth et al. |
| 8,814,373 B2 | 8/2014 | Steel et al. |
| 8,827,517 B2 | 9/2014 | Cammenga et al. |
| 8,885,240 B2 | 11/2014 | Roth et al. |
| 8,925,891 B2 | 1/2015 | Van Huis et al. |
| 9,174,577 B2 | 11/2015 | Busscher et al. |
| 9,838,653 B2 | 12/2017 | Fish, Jr. et al. |
| 2002/0167589 A1* | 11/2002 | Schofield ............... H04N 7/181 348/148 |
| 2002/0191076 A1* | 12/2002 | Wada ............... G06K 9/00604 348/78 |
| 2003/0174237 A1* | 9/2003 | Lee ............... H04N 13/211 348/363 |
| 2004/0040772 A1 | 3/2004 | Ertl et al. |
| 2004/0179008 A1 | 9/2004 | Gordon et al. |
| 2007/0176402 A1 | 8/2007 | Irie et al. |
| 2007/0272837 A1 | 11/2007 | Yoshifuku et al. |
| 2009/0315993 A1* | 12/2009 | Hirai ............... G01N 21/21 348/148 |
| 2009/0316025 A1* | 12/2009 | Hirai ............... B82Y 20/00 348/273 |
| 2010/0283842 A1 | 11/2010 | Guissin et al. |
| 2013/0242061 A1* | 9/2013 | Tsai ............... G03B 35/10 348/49 |
| 2016/0170486 A1* | 6/2016 | Rydberg ............ G06K 9/00604 348/78 |
| 2016/0188987 A1* | 6/2016 | Lisseman ............ H04N 7/18 348/148 |
| 2017/0106892 A1 | 4/2017 | Lisseman et al. |
| 2017/0126986 A1 | 5/2017 | Belote et al. |
| 2017/0166134 A1 | 6/2017 | Gao et al. |
| 2017/0177935 A1 | 6/2017 | Weller et al. |
| 2017/0217369 A1 | 8/2017 | Endo et al. |

FOREIGN PATENT DOCUMENTS

| | | | |
|---|---|---|---|
| JP | 2010056865 A | * | 3/2010 |
| JP | 2017124037 A | | 7/2017 |
| WO | 9842796 A1 | | 10/1998 |
| WO | 9902621 A1 | | 1/1999 |

* cited by examiner

IMAGING SYSTEM FOR IRIS AUTHENTICATION AND DRIVER MONITORING

CROSS-REFERENCE TO RELATED APPLICATIONS

This application claims priority under 35 U.S.C. § 119(e) and the benefit of U.S. Provisional Application No. 62/775,574 entitled IMAGING SYSTEM FOR IRIS AUTHENTICATION AND DRIVER MONITORING, filed on Dec. 5, 2018, by Joshua D. Lintz et al., the entire disclosure of which is incorporated herein by reference.

TECHNOLOGICAL FIELD

The present invention generally relates to an imaging system and method of a vehicle and, more particularly, to an imaging system and method for driver identification and monitoring.

SUMMARY OF THE DISCLOSURE

In one aspect of the disclosure, an imaging system is disclosed. The system comprises a first light source configured to project a first illumination onto a vehicle occupant and a second light source configured to project a second illumination onto the vehicle occupant. The system further comprises an imager comprising a pixel array. A lens apparatus comprises a first lens comprising a first field of view and a second lens comprising a second field of view. At least one shutter is selectively controlled to transmit the first illumination from the first lens to the pixel array. The at least one shutter is further controlled to selectively transmit the second illumination from the second lens to the pixel array. The imager is configured to process the first illumination in the first field of view and the second illumination in the second field of view.

In another aspect of the disclosure, a method for controlling an imaging apparatus configured to monitor an occupant of a vehicle is disclosed. The method comprises selectively activating a first light source illuminating a first portion of the occupant and capturing light emitted from the first light source with a first lens. The method further comprises directing the light from the first lens to an imager comprising a pixel array. The method further comprises selectively activating a second light source illuminating a second portion of the occupant and capturing light emitted from the second light source with a second lens. The method further comprises reflecting the light emitted from the second light source generating reflected light and directing the reflected light to the pixel array of the imager.

In yet another aspect of the disclosure, an imaging apparatus is disclosed. The apparatus comprises a first light source configured to project a first illumination onto a vehicle occupant and a second light source configured to project a second illumination onto the vehicle occupant. The apparatus further comprises an imager comprising a pixel array and a lens apparatus. The lens apparatus comprises a first lens comprising a first field of view, a second lens comprising a second field of view, and at least one shutter. The first lens and the second lens are aligned along parallel focal axes. The apparatus further comprises at least one mirror element configured to transmit light from the first lens to the pixel array received from a first direction and to reflect light from the second lens to the pixel array. A controller is configured to control the at least one shutter in a first configuration configured to selectively transmit the first illumination from the first lens to the pixel array. The controller is further configured to control the at least one shutter in a second configuration to selectively transmit the second illumination from the second lens to the pixel array. The imager is configured to process the first illumination in the first field of view and the second illumination in the second field of view.

These and other features, advantages, and objects of the present device will be further understood and appreciated by those skilled in the art upon studying the following specification, claims, and appended drawings.

BRIEF DESCRIPTION OF THE DRAWINGS

The invention will now be described with reference to the following drawings, in which.

DETAILED DESCRIPTION OF EMBODIMENTS

Figure 1:
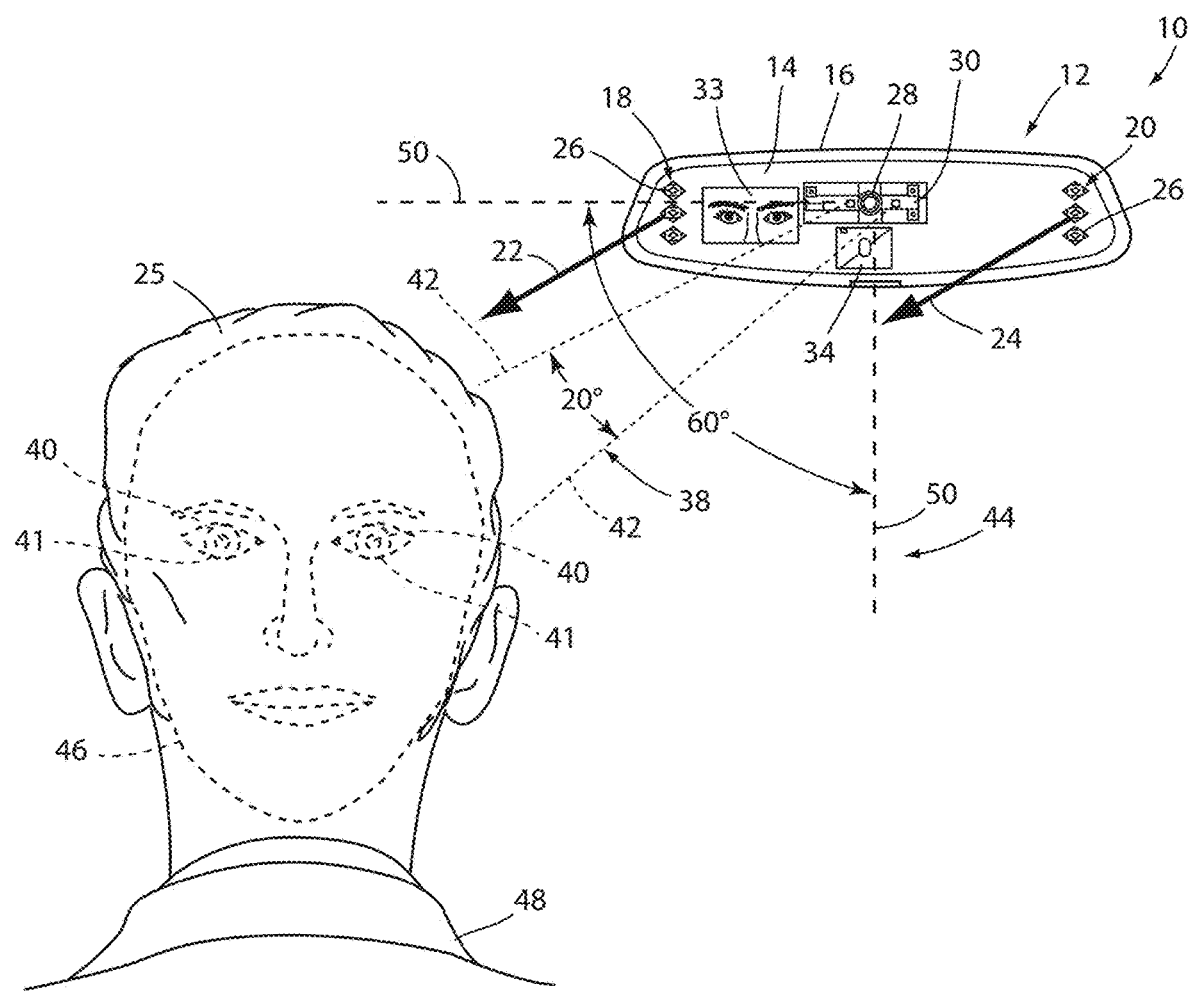
FIG. 1 is a perspective view of an imaging system incorporated in an interior rearview mirror assembly.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 2:
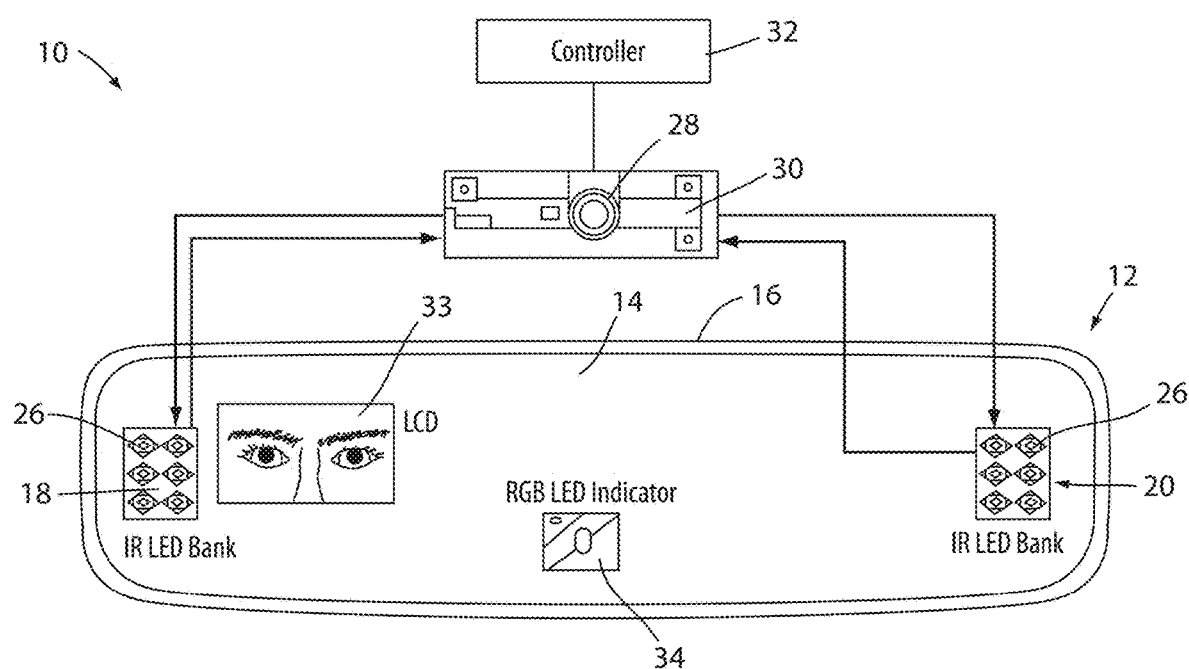
FIG. 2 is a schematic view of the interior rearview mirror assembly shown in FIG. 1.

Referring to FIGS. 1 and 2, reference numeral 10 generally designates an imaging system operable to perform one or more identification functions. An exemplary embodiment of the imaging system 10 is shown incorporated into an interior rearview mirror assembly 12 of an automotive vehicle. The interior rearview mirror assembly 12 may be configured as an electro-optic rearview mirror assembly that is partially reflective and partially transmissive and having a mirror element 14 coupled to a housing 16. Though demonstrated as incorporated in the mirror assembly 12, it may be understood that one or more components of the imaging system 10 may be incorporated in other portions of the vehicle (e.g. panels, an overhead console, visor, center consoles, a steering wheel, etc.).

A first light source 18 and a second light source 20 may be disposed inside the housing 16. Additionally, in some embodiments, the light sources 18, 20 may be positioned separate from the housing 16 (e.g. in an overhead console, vehicle pillar, etc.), while still providing illumination in a field of view of the imaging system 10. In the illustrated example, the light sources 18, 20 may be located in the housing 16 behind the mirror element 14. While the first and second light sources 18, 20 are shown located at opposite sides of the housing 16, it is to be understood that their illustrated positions should not be construed as limiting. In alternative embodiments, the first and/or second light sources 18, 20 may be located elsewhere in the housing 16 or otherwise be provided on external portions of the housing 16.

As shown in FIG. 1, the first light source 18 is configured to project a first illumination generally represented by arrow 22 and the second light source 20 is configured to project a second illumination generally represented by arrow 24. The first and second illuminations are projected through the mirror element 14 onto a vehicle occupant, such as driver 25. In some embodiments, the first and second illumination use the same wavelength. In some embodiments, the first illumination and the second illumination each include a distinct wavelength selected from a near-infrared (NIR) spectrum including wavelengths ranging from 800 nm to 950 nm. The second illumination may have a longer wavelength than the first illumination. In some embodiments, the first illumination may have a wavelength of about 810 nm and the second illumination may have a wavelength of about 940 nm. In some embodiments, the first illumination may have a wavelength of about 860 nm and the second illumination may have a wavelength of about 940 nm. In some embodiments, the first illumination may have a wavelength of about 880 and the second illumination may have a wavelength of 940 nm. The wavelengths of the first and second illuminations are only provided as examples and are not intended to be limiting.

It is generally contemplated that the first and second light sources 18, 20 may each include one or more infrared emitter banks 26 that emit the first and second illumination, respectively. Each emitter bank 26 may include a plurality of light-emitting diodes (LEDs), which may be grouped in a matrix or otherwise grouped in other arrangements. It will be understood that the emitter banks 26 may be positioned anywhere inside the housing 16 that would enable the first and second illumination to be projected onto the driver 25.

As shown in FIGS. 1 and 2, an imager 28 is disposed inside the housing 16 and is exemplarily shown located in a generally central location behind the mirror element 14. The imager 28 is configured to acquire one or more images of a biometric feature of the driver 25 and generates image data corresponding to the one or more acquired images. The imager 28 is further configured with a variable field of view based on which of the first and second light sources 18, 20 is activated.

The first light source 18, the second light source 20, and the imager 28 may be electrically coupled to a printed circuit board (PCB) 30 and are in communication with a controller 32. The controller 32 may be located on the PCB 30, elsewhere located in the housing 16, or elsewhere located in the vehicle. The controller 32 may further be in communication with various devices incorporated in the interior rearview mirror assembly 12 and/or equipment of the vehicle. The controller 32 may include one or more processors configured to selectively activate the first and second light sources 18, 20, and process image data received from the imager 28 to determine an identity of the driver 25 or monitor the driver 25, among other things.

In the present embodiment, the controller 32 may communicate with a display 33 disposed inside the housing 16 of the interior rearview mirror assembly 12 and visible through the mirror element 14. The controller 32 may be configured to operate the display 33 to show image data received from the imager 28. The display 33 may be configured as an LCD, LED, OLED, plasma, DLP, or other display types. Examples of displays that may be utilized are disclosed in U.S. Pat. No. 6,572,233, entitled "Rearview Mirror With Display," U.S. Pat. No. 8,237,909, entitled "Vehicular Rearview Mirror Assembly Including Integrated Backlighting for a Liquid Crystal Display (LCD)," U.S. Pat. No. 8,411,245, entitled "Multi-Display Mirror System and Method for Expanded View Around a Vehicle," and U.S. Pat. No. 8,339,526, entitled "Vehicle Rearview Mirror Assembly Including a High-Intensity Display," all of which are incorporated herein by reference in their entirety.

The controller 32 may also communicate with an indicator 34 configured to output a visual notification indicating an operation state of the imaging system 10. The indicator 34 may be configured as an LED or other light source and is operable by the controller 32 to flash and/or change colors to indicate the operation state of the imaging system 10. In one specific embodiment, the indicator 34 may be configured as an RGB LED operable to indicate the operation state by emitting light expressed in a red color, a green color, a blue color, or any color combination thereof.

In the depicted embodiment of FIGS. 1 and 2, each of the first and second light sources 18, 20 is uniquely associated with an identification function executed by the controller 32. According to a first identification function, or an iris scanning function to identify a vehicle occupant (e.g., driver 25), the controller 32 activates only the first light source 18 to project the first illumination toward the driver 25. As discussed herein, the first illumination may be a NIR illumination having a wavelength in the range of about 810 nm to 880 nm. For example, the first illumination may have a wavelength of 810 nm, of 860 nm, or of 880 nm. In some embodiments, when activating only the first light source 18, the controller 32 also may operate the imager 28 with a first field of view 38 to enable image acquisition of an iris 40 of one or both eyes 41 of the driver 25.

The controller 32 may process image data generated by the imager 28 while operating with the first field of view 38 to identify the driver 25. The first field of view 38 is typically a narrow field of view. In some embodiments, the first field of view 38 may have a first horizontal field component 42 of approximately 20 degrees and a similar or different vertical component (not shown). As shown in FIGS. 1 and 2, image data generated by the imager 28 may be shown on the display 33. Using the display 33 as a reference, the driver 25 may adjust the position of the interior rearview mirror assembly 12 such that the image appearing on the display 33 is properly trained on the necessary biometric feature (e.g., iris 40) required to identify the driver 25. Driver identification may be used alongside vehicle security features and to authorize financial transactions.

According to a second identification function, or a driver monitoring function that includes facial recognition, the controller 32 activates only the second light source 20 to project the second illumination onto the driver 25. As discussed herein, the second illumination may be a NIR illumination having a wavelength of 9 40 nm. In some embodiments, when activating only the second light source 20, the controller 32 also may operate the imager 28 with a second field of view 44 to enable image acquisition of a face 46 and/or body 48 of the driver 25.

The controller 32 may process image data generated by the imager 28 while operating with the second field of view 44 to monitor the driver 25. The second field of view 44 is typically a wide field of view. In some embodiments, the second field of view 44 may have a second horizontal field component 50 of approximately 60 degrees and a similar or different vertical component (not shown). As described herein, image data generated by the imager 28 may be shown on the display 33 and the driver 25 may adjust the position of the interior rearview mirror assembly 12 such that the image appearing on the display 33 is properly trained on the necessary biometric feature (e.g., face 46 and/or body 48) required to monitor the driver 25. Driver monitoring may include monitoring for sleepiness, inattentiveness, and other driver states. Additionally, the imager 28 may be configured to capture image data in the second field of view 44 to provide for an occupancy detection (e.g. passenger occupancy) or detection of various objects in a cabin of the vehicle.

According to one embodiment, it is contemplated that the controller 32 may use output (e.g., an auto gain threshold) from the imager 28 to determine characteristics (e.g., wavelength, intensity, etc.) of the first and/or the second illumination based on current vehicle and/or ambient lighting conditions. In embodiments where the interior rearview mirror assembly 12 is configured as an electro-optic rearview mirror assembly, the controller 32 may additionally, or alternatively, use available feedback mechanisms from a dimming controller to determine the characteristics of the first and/or the second illumination. Additionally, or alternatively, the imaging system 10 may be configured to include manual entry criteria, such as eye color and skin color, to aid the controller 32 in determining the characteristics of the first and/or the second illumination. The criteria may be entered using any available user-input device of the vehicle. By employing one or more of the foregoing features, the imaging system 10 may benefit from improved speed and accuracy with respect to biometric capture and/or user authentication.

Figure 3:
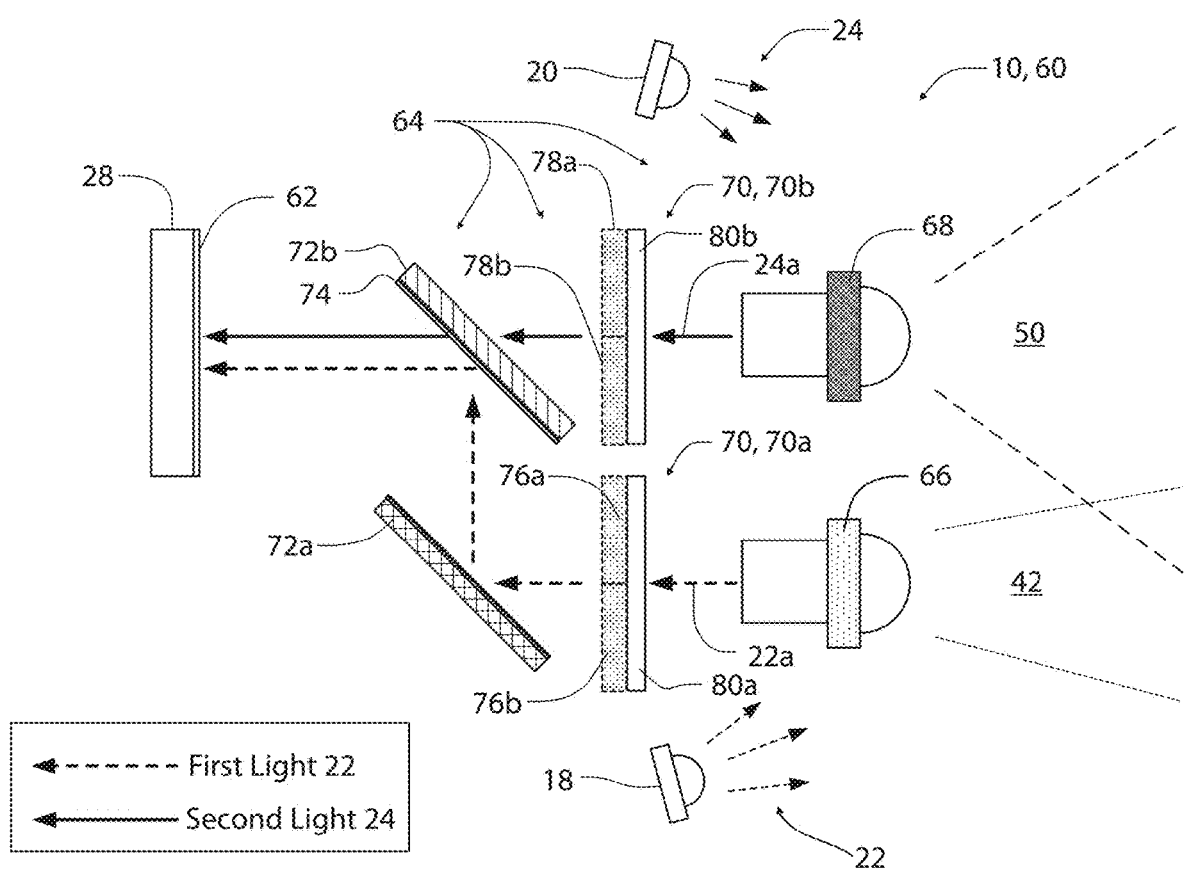
FIG. 3 is a process diagram representing an operation of an imaging system comprising a plurality of fields of view.
Figure 4A:
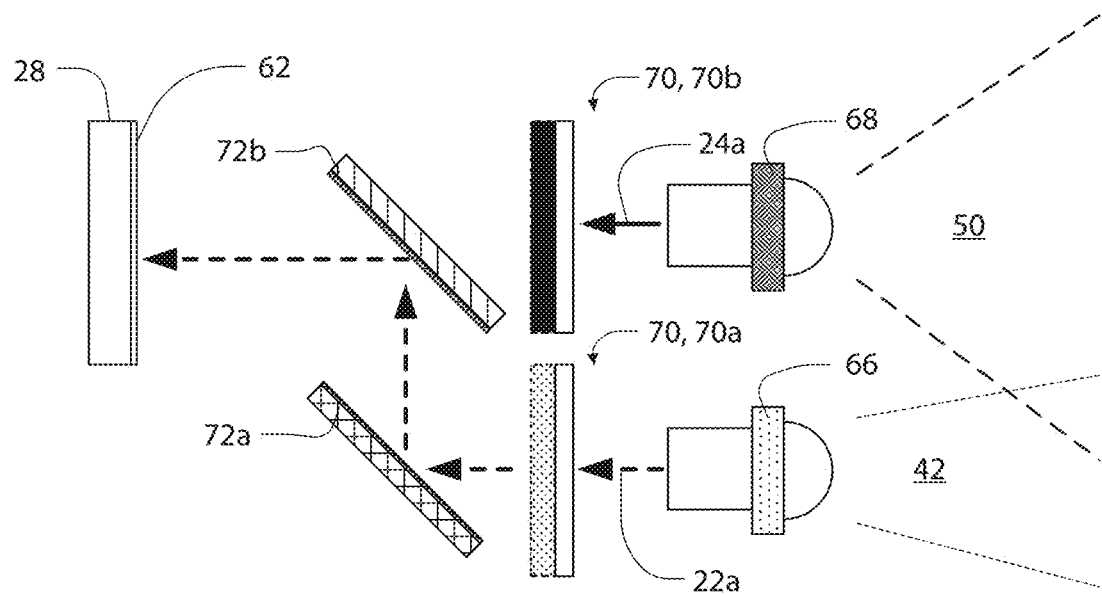
FIG. 4A is a process diagram representing an operation of an imaging system capturing image data in a first field of view.
Figure 4B:
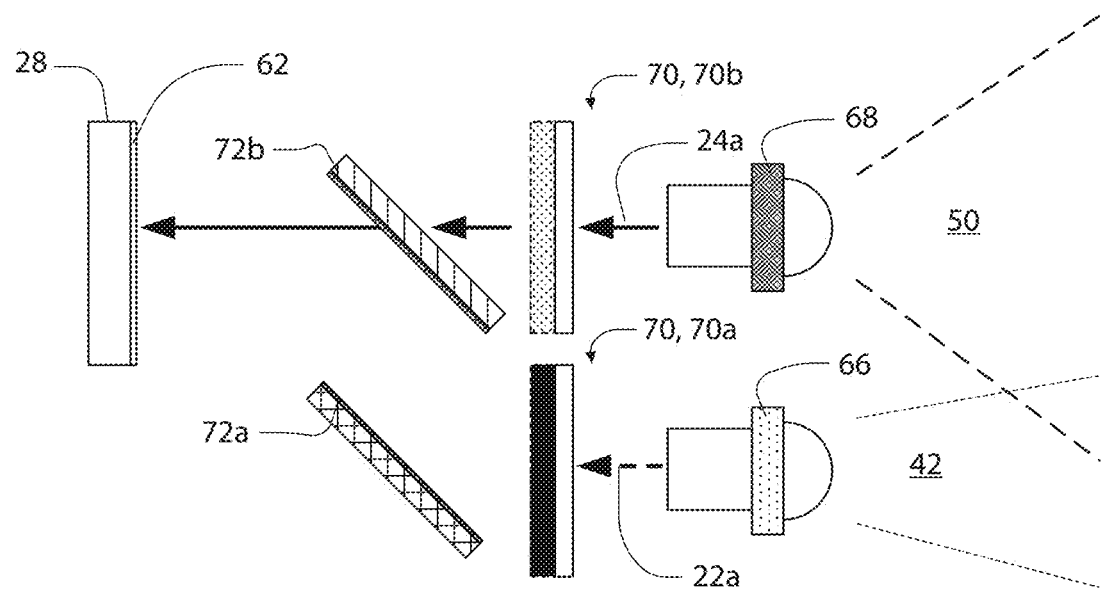
FIG. 4B is a process diagram representing an operation of an imaging system capturing image data in a second field of view in accordance with the disclosure.

Referring now to FIGS. 3, 4A, and 4B, in some embodiments, the imaging system 10 may comprise an interchangeable lens apparatus 60 configured selectively to supply reflected light captured in the first field of view 38 and the second field of view by the imager 28 in the form of a single pixel array 62. In various embodiments, the interchangeable lens apparatus 60 may comprise one or more optic elements 64, which may be configured to selectively direct a first reflected light 22a from the first illumination 22 to the imager 28 through a first lens 66. Additionally, the lens apparatus 60 may be configured to selectively direct a second reflected light 24a from the second illumination 24 to the imager 28 through a second lens 68. In this configuration, the controller 32 may be operable to adjust the field of view of the imaging system 10 from the first field of view 38 to the second field of view 44 in order to selectively capture image data of the iris 40 and the face 46 or body 48 of the driver 25.

The lens apparatus 60 may comprise at least one shutter 70, which may be configured to selectively direct light from each of the lenses 66, 68 to the pixel array 62. In an exemplary embodiment, the at least one shutter 70 may correspond to a first shutter 70a and a second shutter 70b, which may be configured to vary in transmittance in response to one or more electrical control signals supplied by the controller 32. For example, in an exemplary embodiment, each shutter 70a, 70b may correspond to an electro-optic element (e.g. a liquid crystal shutter, electrochromic element, etc.). As shown in FIG. 4A, in response to control signals from the controller 32, the first shutter 70a may be controlled to transmit the first reflected light 22a to process the first identification function. In addition to the control of the first shutter 70a, the controller 32 may further control the operation of the second shutter 70b to transmit the second reflected light 24a to process the second identification function as shown in FIG. 4B. In this way, the imaging system 10 may selectively capture image data for the first identification function or the second identification function with the single pixel array 62 of the imager 28.

The lens apparatus 60 may further comprise a plurality of mirror elements 72. As shown in FIG. 3, the mirror elements 72 may comprise a first mirror element 72a and a second mirror element 72b. The first mirror element 72a may be aligned with a first focal axis A1 of the first lens 66. The second mirror element 72b may be aligned with a second focal axis A2 of the second lens 68. In operation, as shown in FIG. 4A, the first reflected light 22a captured by the first lens 66 may be selectively transmitted through the first shutter 70a, wherein the selective transmission is controlled by the controller 32 to enable the first identification function. Once transmitted through the first shutter 70a, the first reflected light 22a may impinge upon the first mirror element 72a.

The first mirror element 72a may be oriented at a first angle α relative to the first focal axis A1 such that the first reflected light 22a may be reflected in transverse to the first focal axis A1. The first reflected light 22a may then be transmitted to the second mirror element 72b, which may be aligned with the reflection of the first reflected light 22a from the first mirror element 72a and angled at a first angle β relative to the second focal axis A2. In this configuration, the first reflected light 22a may be reflected parallel to the second focal axis A2, which may further be aligned with a focal plane of the pixel array 62. In this way, the controller 32 of the system 10 may selectively control the first reflected light 22a to be received by the imager 28 to process the first identification function. During the capture of the first reflected light 22a, the controller 32 may be configured to control the second shutter 70b to block the transmission of the first reflected light 22a via the second lens 68 to the imager 28 by controlling the second shutter 70b to a darkened, opaque, or otherwise non-transmissive state.

Additionally, as shown in FIG. 4B, the controller 32 may be configured to control the lens apparatus 60 to selectively direct the second reflected light 24a through the second lens 68 to the pixel array 62 of the imager 28 to process the second identification function. While processing the second identification function, the controller 32 may be configured to control the first shutter 70a to block the transmission of the second reflected light 24a to the imager 28 via the first lens 66 by controlling the first shutter 70a to a darkened, opaque, or otherwise non-transmissive state. At the same time, the controller 32 may control the second shutter 70b to transmit the second reflected light 24a in a transmissive state. In this configuration, the second reflected light 24a may be transmitted to the second mirror element 72b. Instead of reflecting the second reflected light 24a, the second mirror element 72b may be configured to pass the wavelengths of the second reflected light 24a through one or more optic filters 74 that may be configured to block or reflect the first reflected light 22a while transmitting the second reflected light 24a. In this configuration, the second reflected light 24a may be transmitted through the optic filter 74 such that the second reflected light 24a is received by the pixel array 62. In this way, the controller 32 may selectively control the lens apparatus 60 to process the second identification routine.

In some embodiments, each of the shutters 70a, 70b may comprise a plurality of pixels 76 and 78. As shown, the plurality of pixels 76 may comprise a first pixel 76a and a second pixel 76b aligned with the first lens 66. The plurality of pixels 78 may comprise a first pixel 78a and a second pixel 78b. The pixels 76 and 78 may provide for the system 10 to gradually or sequentially change from the first identification function to the second identification function. Such operation may be particularly beneficial in embodiments wherein the imager is configured to capture image data with a rolling shutter.

For example, the controller 32 of the system may be configured to transition from the first identification function utilizing the first lens 66 to the second identification function using the second lens 68 in sequence with the rolling shutter and during the capture of an image frame with the pixel array 62. In doing so, if the pixel array 62 operates in a rolling configuration, the controller 32 may selectively control the first pixel 76a aligned with the first lens 66 to transition from a transmissive configuration to an opaque or blocking configuration. Additionally, the controller 32 may selectively control the first pixel 78a aligned with the second lens 68 to transition from an opaque or blocking configuration to a transmissive configuration. Such changes may be may controlled by the controller 32 as the rolling shutter exposes the pixels in the pixel array 62 corresponding to the second pixels 76b and 78b.

Additionally and similar to the transition of the first pixels 76a and 78a, the controller 32 may be configured to transition from the first lens 66 to the second lens 68 in sequence with the rolling shutter of the pixel array 62. The transition may be processed by the controller 32 as the rolling shutter exposes the pixels in the pixel array 62 corresponding to the first pixels 76a and 78a. Accordingly, the transition from the first identification configuration to the second identification configuration may comprise the controller 32 selectively controlling the second pixel 76b aligned with the first lens 66 to transition from a transmissive configuration to an opaque or blocking configuration. Additionally, the controller 32 may selectively control the second pixel 78b aligned with the second lens 68 to transition from an opaque or blocking configuration to a transmissive configuration. Accordingly, the pixels 76 and 78 may provide for the system to seamlessly transition from the first identification configuration to the second identification configuration without interrupting the capture of the image data by the pixel array 62.

In an exemplary embodiment, the first shutter 70a and the second shutter 70b may be implemented as liquid crystal shutter elements. In such embodiments, the shutters 70 may each comprise a polarizing filter 80a and 80b, which may be configured to pass light in a first polarization or a second polarization. The first polarization and the second polarization may be orthogonal to each other. In this configuration, the first shutter 70a may be configured to selectively pass the first polarization and the second shutter 70b may be configured to pass the second polarization. In such embodiments, the optic filter 74 of the second mirror element 72b may comprise a reflective polarizer configured to reflect the first polarization and transmit the second polarization. In this configuration, the first reflected light 22a may be reflected from the second mirror element 72b while the second reflected light 24a may be transmitted through the second mirror element 72b as previously discussed herein.

In some embodiments, one or more of the shutters 70a and 70b may be implemented as electrochromic devices as discussed herein. In such embodiments, the controller 32 may similarly supply control signals to the shutters 70 and 70b to adjust a transmittance of the first reflected light 22a and the second reflected light 24a therethrough. In this way, the electrochromic devices may provide for improved transmission to the imager 28 with limited attenuation. The transition from the first identification configuration to the second identification configuration may require a transition period during which the image data may not be captured by the imager 28. In such embodiments, the optic filter 74 of the second mirror may correspond to a spectral filter. For example, the spectral filter may be configured to pass the wavelengths of the second reflected light 24a (e.g. wavelengths greater than 900 nm [940 nm]) while reflecting the first reflected light 22a (e.g. wavelengths of about 810 nm to 880 nm [810 nm, 860 nm, and/or 880 nm]). In this configuration, the lens apparatus 60 may be controlled by the controller to selectively supply the first reflected light 22a and/or the second reflected to the imager 28.

Additional information on the construction of the mirror element 14 and transflective coatings can be found in U.S. Patent Publication Nos. 2017/0177935 to Weller et al., entitled "MIRROR ASSEMBLY INCORPORATING A SCANNING APPARATUS," and 2017/0166134 to Gao et al., entitled "IR TRANSMITTING COATING FOR ELECTRO-OPTIC ELEMENT," which are incorporated herein by reference in their entirety.

In some embodiments, the mirror element 14 may be an electrochromic element or an element such as a prism. One non-limiting example of an electrochromic element is an electrochromic medium, which includes at least one solvent, at least one anodic material, and at least one cathodic material. Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity change from a first phase to a second phase. The electrochromic component may be a single-layer, single-phase component, multi-layer component, or multi-phase component, as described in U.S. Pat. No. 5,928,572 entitled "Electrochromic Layer and Devices Comprising Same," U.S. Pat. No. 5,998,617 entitled "Electrochromic Compounds," U.S. Pat. No. 6,020,987 entitled "Electrochromic Medium Capable of Producing a Pre-Selected Color," U.S. Pat. No. 6,037,471 entitled "Electrochromic Compounds," U.S. Pat. No. 6,141,137 entitled "Electrochromic Media for Producing a Preselected Color," U.S. Pat. No. 6,241,916 entitled "Electrochromic System," U.S. Pat. No. 6,193,912 entitled "Near Infrared-Absorbing Electrochromic Compounds and Devices Comprising Same," U.S. Pat. No. 6,249,369 entitled "Coupled Electrochromic Compounds with Photostable Dication Oxidation States," and U.S. Pat. No. 6,137,620 entitled "Electrochromic Media With Concentration-Enhanced Stability, Process for the Preparation Thereof and Use In Electrochromic Devices," U.S. Pat. No. 6,519,072, entitled "Electrochromic Device"; and International Patent Publication Nos. WO 98/42796 entitled "Electrochromic Polymeric Solid Films, Manufacturing Electrochromic Devices Using Such Solid Films, and Processes for Making Such Solid Films and Devices" and WO 99/02621 entitled "Electrochromic Polymer Systems," which are herein incorporated by reference in their entirety.

The present disclosure may be used with a mounting system such as that described in U.S. Pat. Nos. 8,814,373; 8,201,800; 8,210,695; 9,174,577; 8,925,891; and 9,838,653; and U.S. Provisional Patent Application Nos. 61/709,716; 61/707,676; and 61/704,869, which are hereby incorporated herein by reference in their entirety. Further, the present disclosure may be used with a rearview packaging assembly such as that described in U.S. Pat. Nos. 8,814,373; 8,646,924; 8,643,931; 8,264,761; and 8,885,240; and U.S. Provisional Patent Application Nos. 61/707,625; and 61/590,259, which are hereby incorporated herein by reference in their entirety. Additionally, it is contemplated that the present disclosure can include a bezel such as that described in U.S. Pat. Nos. 8,827,517; 8,210,695; and 8,201,800, which are hereby incorporated herein by reference in their entirety.

It will be appreciated that embodiments of the invention described herein may be comprised of one or more conventional processors and unique stored program instructions that control one or more processors to implement, in conjunction with certain non-processor circuits, some, most, or all of the functions of the interior rearview mirror assembly 12, as described herein. The non-processor circuits may include but are not limited to, signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application-specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It will be understood by one having ordinary skill in the art that construction of the described invention and other components is not limited to any specific material. Other exemplary embodiments of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. An imaging apparatus comprising:
a first light source configured to project a first illumination onto a vehicle occupant;
a second light source configured to project a second illumination onto the vehicle occupant;

an imager comprising a pixel array;
a lens apparatus comprising:
  a first lens comprising a first field of view;
  a second lens comprising a second field of view;
  at least one mirror element configured to transmit light from the first lens to the pixel array received from a first direction and reflect light received from a second direction from the second lens to the pixel array, wherein the light received from the first direction has a first polarization and the light received from the second direction has a second polarization, wherein the first polarization is passed through the at least one mirror element and the second polarization is reflected from the at least one mirror element; and
  at least one shutter; and
a controller configured to control the shutter to selectively transmit light from the first illumination or the second illumination to the pixel array from one of either the first lens or the second lens.

2. The imaging apparatus according to claim 1, wherein the controller is further configured to:
  control the at least one shutter in a first configuration configured to selectively transmit the first illumination from the first lens to the pixel array.

3. The imaging apparatus according to claim 2, wherein the controller is further configured to:
  control the at least one shutter in a second configuration to selectively transmit the second illumination from the second lens to the pixel array, wherein the imager is configured to process the first illumination in the first field of view and the second illumination in the second field of view.

4. The imaging apparatus according to claim 1, wherein the first and second illuminations comprise light in a near-infrared (NIR) spectrum from 700-1000 nm.

5. The imaging apparatus according to claim 4, wherein the second illumination comprises longer wavelengths than the first illumination.

6. The imaging apparatus according to claim 5, wherein the first illumination comprises wavelengths of 820 nm to 920 nm and the second illumination comprises wavelengths of 900 nm to 1000 nm.

7. The imaging apparatus according to claim 1, wherein the at least one shutter comprises a first shutter and a second shutter, wherein the controller is configured to control the first shutter to a transmissive state to transmit the first light to the imager while controlling the second shutter to an opaque state.

8. The imaging apparatus according to claim 7, wherein the controller is configured to control the second shutter to a transmissive state to transmit the second light to the imager while controlling the first shutter to an opaque state.

9. The imaging apparatus according to claim 1, wherein the at least one shutter comprises a liquid crystal shutter element.

10. The imaging apparatus according to claim 1, wherein the at least one shutter comprises an electrochromic device.

11. The imaging apparatus according to claim 1, wherein the first lens and the second lens are aligned along parallel focal axes, and wherein the first direction and the second direction extend and intersect proximate to the at least one mirror element.

12. The imaging apparatus according to claim 1, wherein the at least one mirror element comprises an optic filter extending over a light-receiving surface, wherein the optic filter is configured to transmit light received from the first lens and reflect light received from the second lens.

13. A method for controlling an imaging apparatus configured to monitor an occupant of a vehicle, the method comprising:
  selectively activating a first light source illuminating a first portion of the occupant;
  capturing light emitted from the first light source with a first lens;
  directing the light from the first lens to an imager comprising a pixel array, wherein the light received from the first lens comprises a first polarization;
  selectively activating a second light source illuminating a second portion of the occupant;
  capturing light emitted from the second light source with a second lens;
  reflecting the light emitted from the second light source generating reflected light, wherein the reflected light has a second polarization, orthogonal to the first polarization;
  directing the reflected light to the pixel array of the imager; and
  controlling at least one shutter device to selectively transmit light to the pixel array of the imager from either the first lens or the second lens in response to the activation of the first light source or the second light source, respectively,
  wherein the first lens is configured to capture image data in a first field of view depicting the first portion and the second lens is configured to capture image data in a second field of view depicting the second portion, wherein the first field of view is different and wider than the second field of view.

14. The method according to claim 13, wherein the second portion and the second field of view are positioned within the first field of view.

15. An imaging apparatus comprising:
  a first light source configured to project a first illumination onto a vehicle occupant;
  a second light source configured to project a second illumination onto the vehicle occupant;
  an imager comprising a pixel array;
  a lens apparatus comprising:
    a first lens comprising a first field of view;
    a second lens comprising a second field of view, wherein the first lens and the second lens are aligned along parallel focal axes, wherein the first field of view is different and wider in a horizontal field than the second field of view; and
    at least one shutter configured to vary in transmittance in response to one or more electrical control signals supplied by a controller;
  at least one mirror element configured to transmit light having a first polarization from the first lens to the pixel array received from a first direction and to reflect light having a second polarization from the second lens to the pixel array, wherein the first polarization and the second polarization are orthogonal to each other; and
  the controller configured to:
    control the at least one shutter in a first configuration configured to selectively transmit the first illumination from the first lens to the pixel array; and
    control the at least one shutter in a second configuration to selectively transmit the second illumination from the second lens to the pixel array, wherein the imager is configured to process the first illumination in the first field of view and the second illumination in the second field of view.

* * * * *